US009325696B1

(12) United States Patent
Balfanz et al.

(10) Patent No.: US 9,325,696 B1
(45) Date of Patent: Apr. 26, 2016

(54) SYSTEM AND METHOD FOR AUTHENTICATING TO A PARTICIPATING WEBSITE USING LOCALLY STORED CREDENTIALS

(75) Inventors: Dirk Balfanz, Redwood City, CA (US); Michael K. Fleming, San Francisco, CA (US); Doru Costin Manolache, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 13/363,338

(22) Filed: Jan. 31, 2012

(51) Int. Cl.
*H04L 29/06* (2006.01)
(52) U.S. Cl.
CPC .................................. *H04L 63/0815* (2013.01)
(58) Field of Classification Search
CPC .................................................. H04L 63/0815
USPC ..................................... 726/10; 713/159, 175
See application file for complete search history.

(56) References Cited

U.S. PATENT DOCUMENTS

| 6,032,260 | A * | 2/2000 | Sasmazel et al. ............... 726/10 |
| 7,278,025 | B2 * | 10/2007 | Saito et al. ..................... 713/185 |
| 7,428,750 | B1 * | 9/2008 | Dunn et al. ......................... 726/8 |
| 8,060,916 | B2 * | 11/2011 | Bajaj ..................... H04L 9/3213 713/168 |
| 2001/0023414 | A1 * | 9/2001 | Kumar et al. .................... 705/35 |
| 2002/0095569 | A1 * | 7/2002 | Jerdonek ....................... 713/155 |
| 2002/0133706 | A1 * | 9/2002 | Khanna ................... G06F 21/31 713/182 |
| 2003/0200465 | A1 * | 10/2003 | Bhat ................... H04L 63/0815 726/8 |
| 2004/0003259 | A1 * | 1/2004 | Chang ........................... 713/182 |
| 2004/0187036 | A1 * | 9/2004 | Nakamura .......... G06F 21/6218 726/7 |
| 2005/0216582 | A1 * | 9/2005 | Toomey et al. ............... 709/224 |
| 2006/0218629 | A1 * | 9/2006 | Pearson ............ G06F 17/30873 726/8 |
| 2006/0282678 | A1 * | 12/2006 | Ali ......................... G06F 21/34 713/185 |
| 2007/0180380 | A1 * | 8/2007 | Khavari et al. ................ 715/704 |
| 2007/0244904 | A1 * | 10/2007 | Durski ....................... G06F 8/30 |
| 2008/0222714 | A1 * | 9/2008 | Wahl ....................... H04L 63/08 726/9 |
| 2009/0248632 | A1 * | 10/2009 | Subramanian .................... 707/3 |
| 2009/0249078 | A1 * | 10/2009 | Kim ................... H04L 63/0815 713/185 |
| 2010/0024015 | A1 * | 1/2010 | Hardt .............................. 726/6 |
| 2010/0049790 | A1 * | 2/2010 | Schreiber ........... G06Q 30/0273 709/203 |
| 2011/0078437 | A1 * | 3/2011 | Reddy ................ H04L 63/0815 713/155 |
| 2011/0126010 | A1 * | 5/2011 | Kim ................... H04L 63/0853 713/168 |
| 2011/0178925 | A1 * | 7/2011 | Lindelsee .............. G06Q 20/00 705/44 |

OTHER PUBLICATIONS

Yang, Feng, and Sathiamoorthy Manoharan. "A security analysis of the OAuth protocol." Communications, Computers and Signal Processing (PACRIM), 2013 IEEE Pacific Rim Conference on. IEEE, 2013.*

* cited by examiner

*Primary Examiner* — Harris C Wang
(74) *Attorney, Agent, or Firm* — McDermott Will & Emery LLP

(57) ABSTRACT

A system and method is disclosed for authenticating a user using locally stored credentials. A website is configured to provide, to a web browser, a login page, including header information which informs the web browser that the website may accept an automatic login. In response to receiving, from the web browser, credential information and a request to login to the website, a login token having an expiration time is generated by an authentication server and returned to the web browser. The web browser provides the login token to an authentication address associated with the website, before the expiration time, to automatically login to the website.

23 Claims, 8 Drawing Sheets

SYSTEM AND METHOD FOR AUTHENTICATING TO A PARTICIPATING WEBSITE USING LOCALLY STORED CREDENTIALS

TECHNICAL FIELD

The subject technology relates generally to website authentication techniques.

BACKGROUND

A user of a computing device may have multiple usernames corresponding to one or more user accounts or email addresses. While using a web browser the user may be presented with a login page. Even if the credentials required to authenticate to the login page are the same as those stored in the device for other applications, web browser restrictions may force the user to manually enter the credentials at the login page.

SUMMARY

The subject technology provides a system and method for authenticating to a participating website using locally stored credentials. According to one aspect, a computer-implemented method may include displaying for selection one or more locally stored user identifications in response to navigating to a login page of the website, receiving a selected user identification, sending to a remote authentication server, locally stored credential information corresponding to the selected user identification, receiving, from the remote authentication server, a login token corresponding to the website, on receiving the login token, navigating to an authentication address, and providing the login token to a server located at the authentication address to receive authorization to view the website.

In another aspect, a system may include an authentication server and an account manager component located at a client computing device, remote from the authentication server. The account manager component may include component instructions that, when executed, cause the account manager component to receive an auto-login request related to a website, including an account identifier, from a web browser, lookup credential information corresponding to the account identifier, send the credential information to the authentication server, receive a login token from the authentication server, and provide the login token to the web browser for authentication to the website. The authentication server may include server instructions that, when executed, cause the server to receive credential information from the client computing device, generate a login token corresponding to the website, set an expiration time related to the login token, and send the login token to the client device.

In a further aspect, a machine-readable medium having machine-executable instructions stored thereon, which when executed by a machine or computer may cause the machine or computer to perform a method of authenticating a user to a website. In this regard, method may include receiving, from a client computing device, credential information and a request to login to the website, generating a login token corresponding to the website, setting an expiration time related to the login token, sending the login token and an authentication address to the client device, receiving a request from a server located at the authentication address to validate the login token, and, on confirming the request was made before the expiration time, validating the login token for the server located at the authentication address to authorize a user to view the website.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
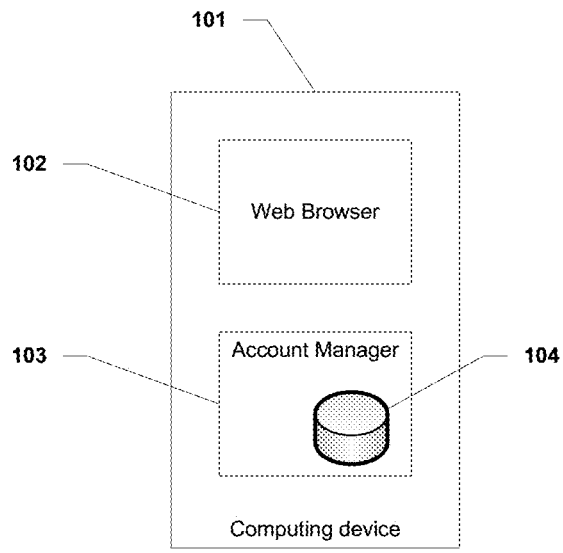
FIG. 1 is a diagram of an example computing device, including a web browser and an account manager, for storing user credentials according to one aspect of the subject technology.

FIG. 1 is a diagram of an example computing device, including a web browser and an account manager, for storing user credentials according to one aspect of the subject technology. A computing device 101 (for example, a personal or notebook computer, tablet computer, smart phone, PDA, or the like) may be configured to load and execute a web browser 102 for the display of one or more websites and/or browser components (for example, software extensions, plugins, add-ons, themes, web browser applications, and the like that require an authentication by a user before the component may be used).

Computing device 101 may be configured to store credential information related to a user (for example, of computing device 101) in an account manager 103. Account manager 103 may include a local storage 104 (for example, a local database, data directory, file system, a memory-resident data object, or the like) associated with computing device 101 and/or web browser 102. As will be described in further detail, data stored in and managed by account manager 103

(for example, in local storage 104) may include authentication credentials, configuration data, component data and settings, state information, cookies, and the like for authenticating the user to one or more websites. In one aspect, account manager 103 may be an operating system component (for example, a service). In another aspect, account manager 103 may be, for example, an operating system component that has been granted access to, or integrated with, web browser 102. Credential information stored in account manager 103 may include credentials (for example, a passwords, OAuth tokens, cryptographic keys, or the like) related to the authorization of a user to one or more websites or secure browser components.

Figure 2:
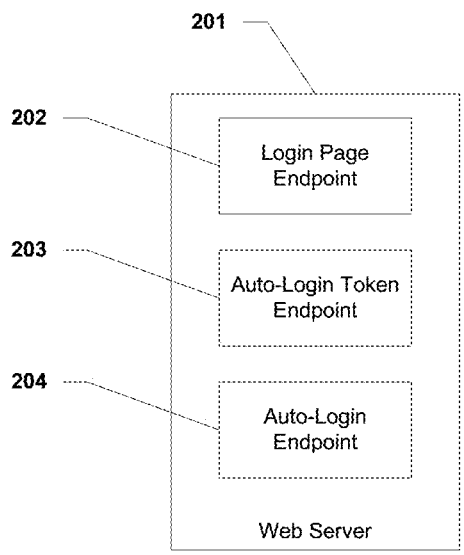
FIG. 2 is a diagram of an example web server related to a participating website for authenticating a user using locally stored credentials according to one aspect of the subject technology.

FIG. 2 is a diagram of an example web server related to a participating website for authenticating a user using locally stored credentials according to one aspect of the subject technology. Server 201 may include one or more endpoint components for communicating with one or more web browsers over a network (for example, a local area network, wide area network, the Internet, or the like). Server 201 may include, for example, a login-page endpoint 202. Login page endpoint 202 may include instructions that, when executed, cause server 201 to serve a login page (for example, a page that says "Welcome. Please enter your username and password") to a web browser (for example, web browser 102). Login page endpoint 202 may also encode data that facilitates an auto-login in, for example, a HTTP response header. An auto-login token endpoint 203 may receive user credentials and auto-login data (for example, from a web browser), and may return a login token, for example, in the form of a URL that may be visited by a web browser (for example, web browser 102). An auto-login endpoint 204 may include instructions that, when executed, configure server 201 to accept login information (for example, in the form of a login token provided by a web browser) and log a user into a website operating in connection with server 201 (for example, a website hosted by server 201).

In some aspects, login page endpoint 202, auto-login token endpoint 203, and auto-login endpoint 204 may be located on a single server 201. In other aspects, login page endpoint 202, auto-login token endpoint 203, and auto-login endpoint 204 may be distributed across multiple servers. For example, an authentication server may control centralized authentication for multiple participating websites, each located at a different server. In this manner, login page endpoint 202 and auto-login endpoint 204 may be located at a participating server for initiating an auto-login to a participating website, and for receiving credentials validated by the authentication server. Accordingly, the authentication server may include auto-login token endpoint 203 for providing a login token and/or a means for validating credentials provided by a web browser, for use at the participating website.

Figure 3A:
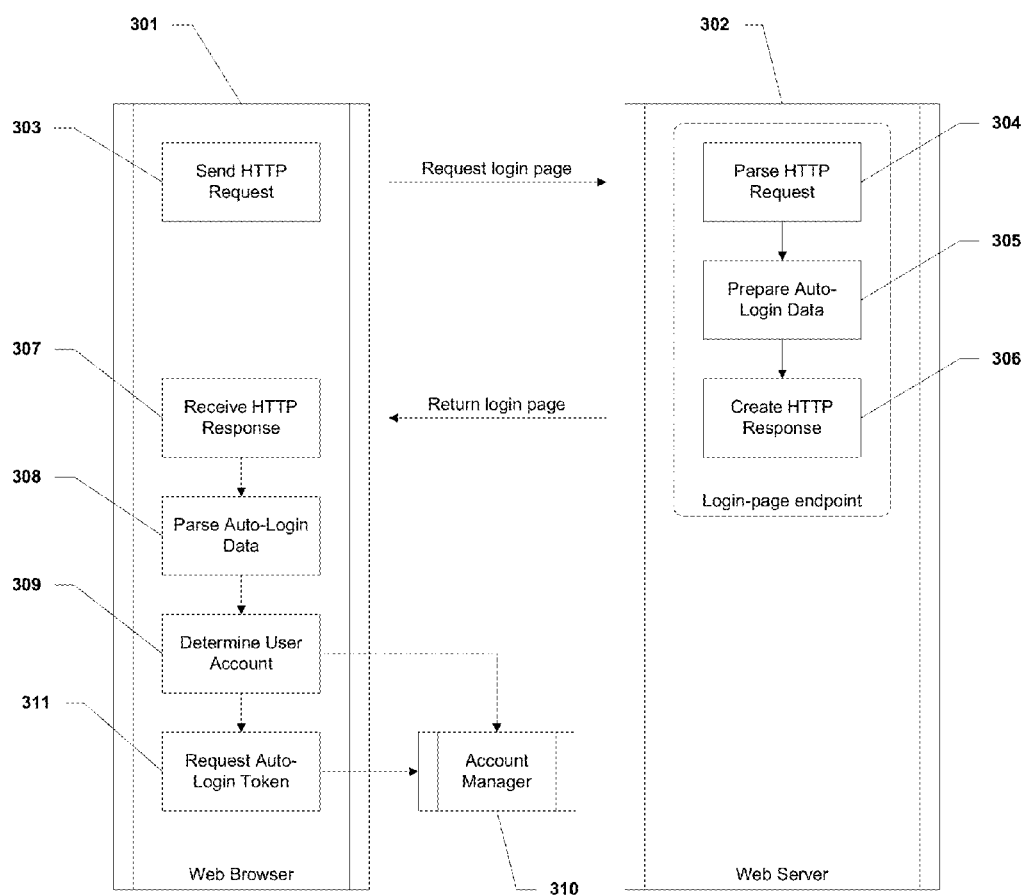
FIGS. 3A to 3C illustrate examples of components and a process for authenticating a user to a participating website using locally stored credentials according to one aspect of the subject technology.
Figure 3B:
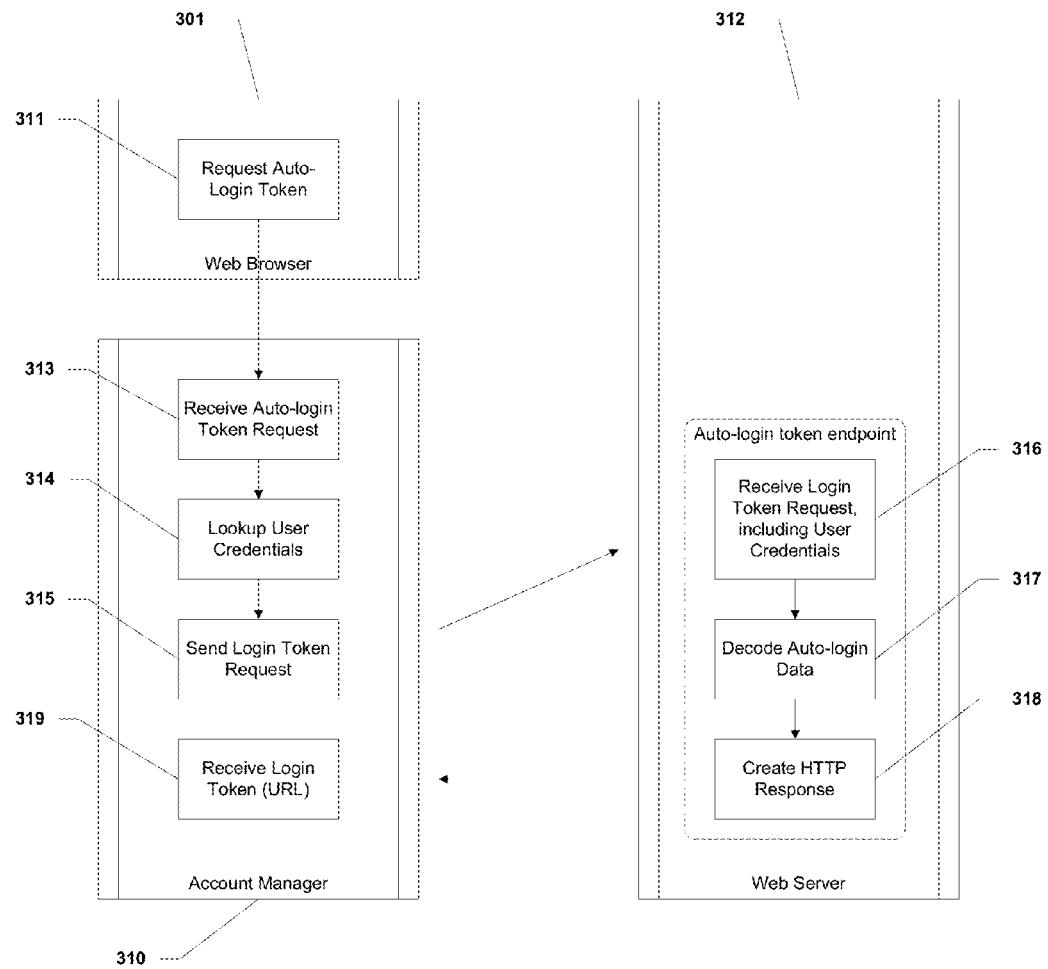
Figure 3C:
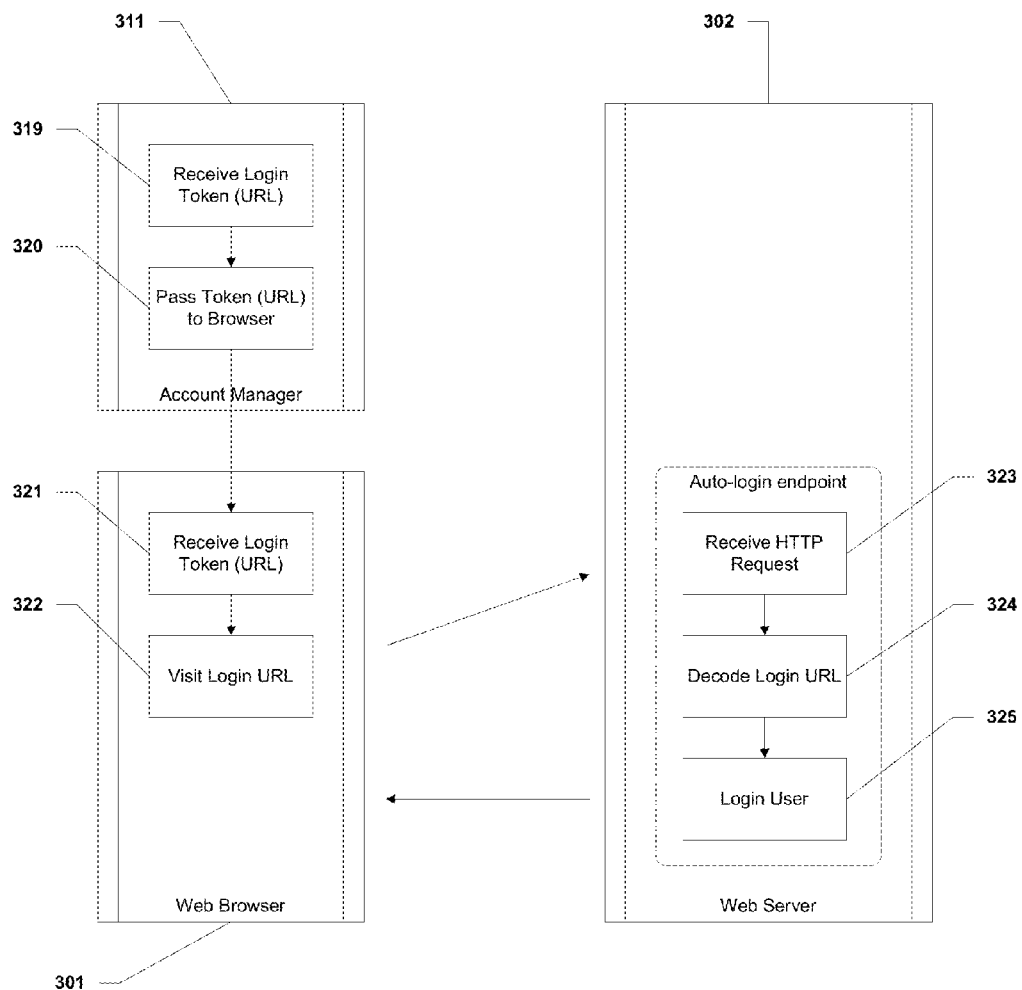

FIGS. 3A to 3C illustrate examples of components and a process for authenticating a user to a participating website using locally stored credentials according to one aspect of the subject technology. As depicted by FIG. 3A, a web browser 301 may be in operable communication with a login-page endpoint (for example, login-page endpoint 202) of a participating web server 302. At 303, web browser 301 issues a request to fetch a login page (for example, in response to the user typing http://login.example.com) from a web server 302. In another example, a user may type the URL of a participating website (for example, http://somemailservice.com) in their browser, and the website, noticing that the user is not logged in, may redirect the browser to a centralized web server (for example, at https://www.[login_domain].com/accounts/Login?continue=[originating_website].com). In this case, web browser 301 may issue the request for a login page as part of a server redirect instruction.

At 304, on the server side, web server 302 may receive the request, parse the request, and determine from the request the context of the login, for example, which website the login originated from (for example, if the login URL was https://www.[login_domain].com/accounts/Login?continue=[originating_website].com).

In this regard, web server 302 may store (for example, in memory) that the user needs to be redirected back to the originating website after the user is authenticated. At 305, depending on the context of the login, web server 302 may prepare auto-login data for inclusion into a server response (for example, in addition to the actual login page itself). The auto-login data may include (for example, as an encoded header) the context, such as the fact that the user needs to be redirected to the participating website after login. At 306, web server 302 creates and sends web browser 301 an HTTP response, including a login page (for example, as HTML), together with the auto-login data. In one example, the login-data is transmitted in an auto-login HTTP response header.

The auto-login header may be added to the HTTP response for a login page (for example, responses to /accounts/ServiceLogin, /accounts/AddSession, /a/domain.com/Login, etc.) In one example, the auto-login header may be added only to responses with an HTTP response code 200 (for example, no other responses, such as HTTP response codes 302, 500, and the like, will contain the header).

With reference to FIG. 1, a computing device 101 may, in one example, include multiple account managers 103. Each account manager may be implemented, for example, as a component (for example, an instantiated object) on computing device 101 or within web browser 301, and may contain login information specific to a corresponding web server (or login page endpoint 202). In this regard, the auto-login header added to the HTTP response at 306 may facilitate selection of one of multiple account managers on a computing device, for use in authenticating a session of web browser 301 to web server 302. The auto-login header may contain, for example, a collection of parameter-value pairs, for example, in x-www-form-encoded encoding. In some aspects, the auto-login header may contain the following parameters (which are processed by the browser):

"realm"—Identifies which account manager may be used at the subject web site. The parameter may include a simple text expression corresponding to a web domain (for example, "com.[login_domain]"), which may be used to index multiple account managers on a computing device.

"account"—This parameter, if present, may tell the web browser that only this account should be allowed to automatically login at this point. The format of this parameter may depend on the realm parameter. For example, if the com.[login_domain] realm relates to an online mail service, this may include an email address. The browser may query the authenticator object for the given realm and, if one of the accounts provided from that authenticator object equals the previously described account parameter, that account may be used to login the user. If no accounts match the account header parameter, then an automatic login may not be available for the login page.

"args"—A parameter that may be passed to an account manager component (for example, account manager 103) and contains information that allows an authentication server to construct a valid login URL. Some examples may include:

X-Auto-Login: realm=com.[login_domain]&args=continue%3Dhttp%253A%252F%252Fmail.[login_domain].com%252Fmail%26service%3Dmail X-Auto-Login: realm=com.[login_domain]&account=fred.example%40[mail_domain].com&args=kfdshfwoeriudslkfsdjfhdskjfhsdkr X-Auto-Login: realm=com.[login_domain]&args= sdlk-fjsdlfkj With continued reference to FIG. 3A, at 307, web browser 301 receives the HTTP response and notices, including, for example, the auto-login header. At 308, web browser 301 decodes the header and extracts the auto-login data. In one aspect, the auto-login data may contain no particular meaning to web browser 301, which may merely pass it along to an account manager 310. At 309, web browser 301 may connect to the account manager 310 (for example, account manager 103 and/or local storage 104) to retrieve a list of one or more stored user accounts. Web browser 301 may then inform the user that automated login is available and provide for display in a native browser user interface the list of accounts retrieved from account manager 310. The user may then select one of the accounts, and indicate that the selected login should be used to login (for example, by clicking on a "Login" button). On receiving an indication to login using the selected account, at 311, web browser 301 may request a login token corresponding to the selected account from account manager 310.

When web browser 301 notices the auto-login header, it may get the list of accounts from one or more account managers and display them in a user interface within web browser 301. Web browser 301 may continue to render the login page in parallel with the display of the list of accounts. If more than one user account is included in the list (or the list includes optional user accounts), web browser 301 may filter the list down to display only those user accounts that match the login page. In another aspect, web browser 301 may display a list of the matching accounts and request that the user "pick an account to log into". In some aspects, the user interface and/or list is displayed in a way that does not obstruct the actual login page. For example, the user may be able to interact with the login page as if the user interface was not present (for example, for when the list of accounts does not include the account the user wishes to log into). In one aspect, the user interface may include a graphic bar (for example, a "butter bar") displayed near a top of a content pane of the web browser, displaying all the accounts available for auto-login. The graphic bar may be dismissible by the user (for example, in a manner similar to the notification area after it's pulled down).

In a further process depicted by FIG. 3B, account manager 310 may be in operable communication with a auto-login token endpoint (for example, auto-login token endpoint 203) of an authentication server 312 to facilitate the generation of a login token. At 313, account manager 310 may receive, from web browser 301, the request for a login token. The request may include an indication (for example, resulting from a selection by a user from the list of user accounts) of which account should be used (for example, the selected user account), as well as the auto-login data originally included in, for example, the previously described auto-login header. At 314, account manager 310 may look up account credentials (for example, a username and/or a password), for example, in a storage associated with account manager 310. At 315, account manager may send a login token request, which may include the user account credentials and/or the auto-login data, to authentication server 312.

At 316, authentication server 312 may receive the request, and validate the credentials, for example, by confirming that the provided username and password match an existing user account, and that the user account is authorized to authenticate to the originating website. At 317, authentication server 312 may decode the auto-login data (for example, parse the auto-login data as a list of parameter-value pairs) and obtain the original context of the user login. For example, the decoded auto-login data may provide the location where the user needs to be redirected to next (for example, an address of the originating website). It may then prepare a login token. A login token may be in the form of, or include, a URL of an authentication server (for example, an authentication address). The login token may include one or more of the following properties: (1) the login token may only be created by the server (for example, it cannot be guessed), (2) the URL and/or the token are valid only for a short period of time (for example, 15 seconds), (3) the URL may, when visited by web browser 301, log in a user to the originating website using the login token.

In one example, a login token might look like this:
https://www.[authserverwebsite].com/accounts/AutoLogin?auth=[signature_code]&continue=[originatingwebsite].com The signature_code may include cryptographic signature bits (for example, a digital signature), and may encode user-specific data, for example, a user identity (for example, a username), when the URL expires, and/or the like. At 318, authentication server 312 may create an HTTP response, including the login token (for example, as an encoded URL) for transmission back to account manager 310. Account manager 310, at 319, may then, on receiving the response, provide the login token to web browser 301.

As depicted by FIG. 3C, web browser 301 may be in operable communication with a auto-login endpoint (for example, auto-login token endpoint 204) of, for example, web server 301, to facilitate the automatic login of the user to the participating website. At 320, on receiving the login token, account manager 310 may pass the login token (for example, received at 319 from authentication server 312) to web browser 301. At 321, web browser 301 may receive the login token and, at 322, navigate to the URL corresponding to the login token. In one aspect, the URL includes an internet address of web server 302. At 323, web server 302 may receive the request.

In one example, the request might look something like this:
GET/accounts/AutoLogin?auth=[signature]&continue=[originatingwebsite].com HTTP/1.0 . . . .

At 324, web server 302 may decode the login token and check its validity. In one example, the login token may be set (for example, at authentication server 312) to expire. In this regard, web server 302 may confirm that the digital signature contained in the "auth=[signature]" bits, verify that an expiration time encoded in the same bits has not expired (for example, by comparing the expiration time against a current server time or by requesting confirmation that the login token remains valid from authentication server 312), decode the user identity, and the like. At 325, upon successful verification of the login token, the server may log in the user. This may include things like setting cookies and the like, and redirecting web browser 301 to the originating website.

Figure 4:
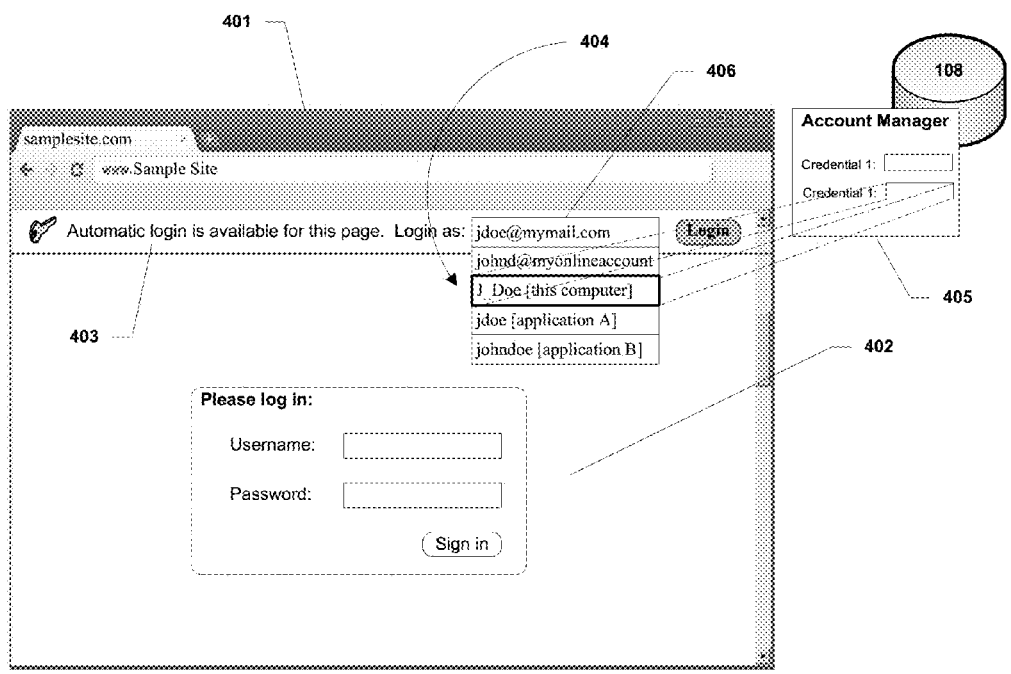
FIG. 4 is a diagram of an example web browser, including a display of a participating website for authenticating a user using locally stored credentials, according to one aspect of the subject technology.

FIG. 4 is a diagram of an example web browser, including a display of a participating website for authenticating a user using locally stored credentials, according to one aspect of the subject technology. A web browser 401 (for example, web browser 301) may be directed to the display of a login page 402 of a participating website (for example, hosted by server 302). When the page is displayed, web browser 401 may receive (for example, detect) auto-login data transmitted from the participating website to web browser 401 in, for example, a HTTP response header. On receiving the auto-login data, a butter bar 403 may be rendered in parallel with login page 402.

In one aspect, a list of available user accounts 404 may be retrieved from an account manager component 405 and displayed in connection with butter bar 403. For example, as depicted by FIG. 4, user accounts 404 may be displayed as selectable options in a drop down menu. A majority of users may only have one user account (for example, a user account associated with the device displaying web browser 401) in account manager 405. In this case, the text on butter bar 403 may state, for example, "Login with your account jane.doe@[myaccount].com." For users with multiple accounts, a primary user account may be displayed in a text box 406, with other user accounts hidden in drop down list 404.

In one aspect, web browser 401 is configured to display butter bar 403 before login page 402 is completely rendered and displayed in web browser 401. In this regard, butter bar 403 may be displayed to a user before the user begins typing into username and password fields provided by login page 402. In another aspect, web browser 401 may delay display of login page 402 until butter bar 403 is displayed, or may delay rendering butter bar 403 until login page 402 has completely rendered.

Figure 5:
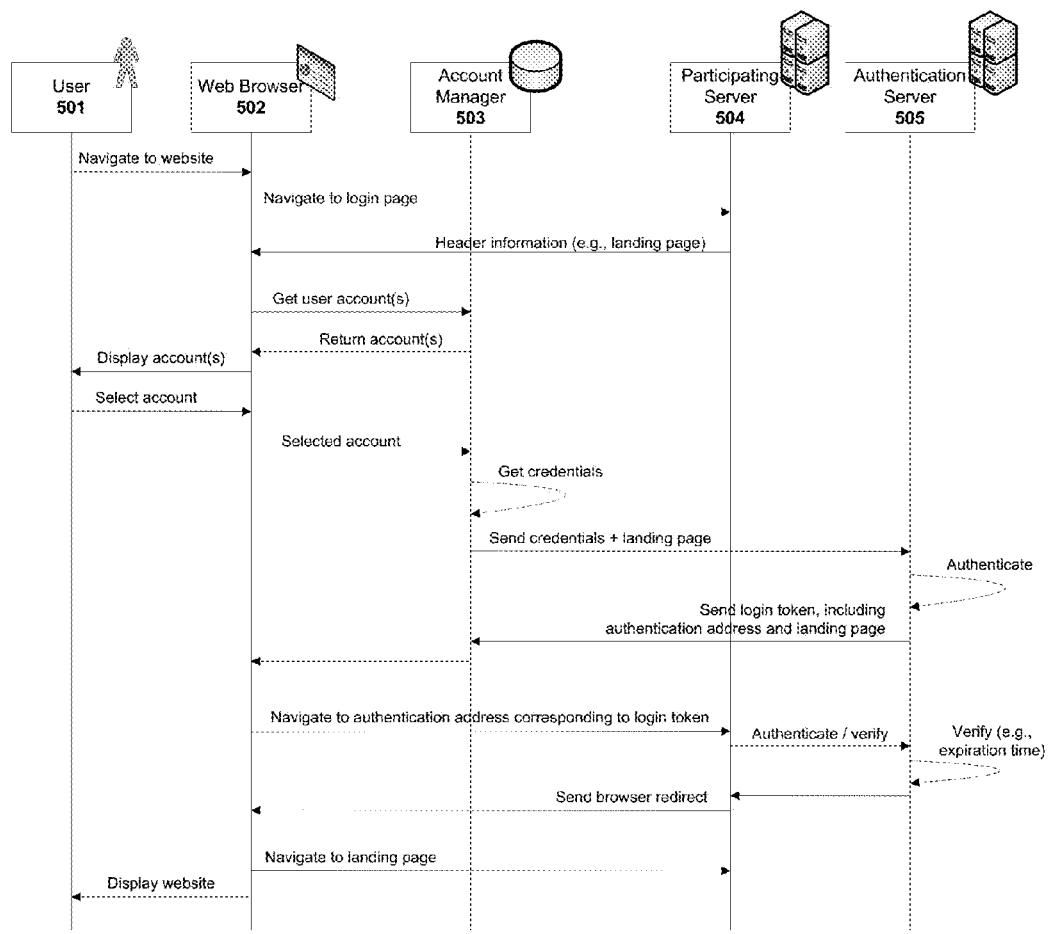
FIG. 5 is a diagram of an example sequence of processes for authenticating a user using locally stored credentials according to one aspect of the subject technology.

FIG. 5 is a diagram of an example sequence of processes for authenticating a user using locally stored credentials according to one aspect of the subject technology. A user 501 may view a login page of a participating website (for example, login page 402) using a web browser 502. User 501 may manually enter credential information directly into the login page or select from a list of locally stored credentials. On selection of one of the listed credentials, the selected credentials are automatically sent to the participating website for authentication without further input from the user.

A computing device is configured with an account manager component 503 (for example, account manager 310 or 405) for locally storing one or more sets of credentials corresponding to respective user accounts. The credentials may, for example, correspond to a user account closely associated with the participating website. Alternatively, the credentials may correspond to a user account associated with an application (for example, a device's operating system, an online user account, secure browser component, or the like) that is authorized to view the website. In one aspect, a stored set of credentials may also facilitate authentication to one or more participating websites located on a participating server 504 (for example, web server 302). Each participating website may be configured with login header information to signal a web browser that the website accepts automatic logins. The login header information may also, for example, include an address of a landing page where the browser should be redirected upon authentication to the website.

On receiving the login header information from the login page, web browser 502 may access account manager 503 to retrieve the usernames corresponding to user credentials stored on the computing device, and then display those usernames in a graphical control (for example, a "butterbar") in web browser 502. On receiving a selected username from the control, web browser 502 may pass the username and the login header information, along with a request for a login token, to account manager 503. Account manager 503 then retrieves authentication credentials corresponding to the selected username from a local storage and sends the authentication credentials, selected username, and login header information to an authentication server 505 (for example, behind the scenes). In one aspect, the authentication credentials may be encrypted and sent to the authentication server over a secure connection (for example, https).

Authentication server 505 may validate the authentication credentials received from the account manager component against a centralized authentication database and generate a login token (for example, a URL address) corresponding to the participating website. The login token may be set with a limited expiration time, and may include the address of the previously described landing page (for example, taken from the login header information). Authentication server 505 may send the login token back to account manager 503. Account manager 503 then passes the login token to web browser 502, and web browser 502 navigates to a URL address corresponding to the login token, for example, an address of participating server 504. Participating server 504 may be operably connected to authentication server 505 (for example, via a web service). In some aspects, participating server 504 may verify the login token with authentication server 505. If the token is verified within the limited expiration time, web browser 502 may be authenticated to the user account and web browser 502 may be redirected to the address of the website's landing page.

Figure 6:
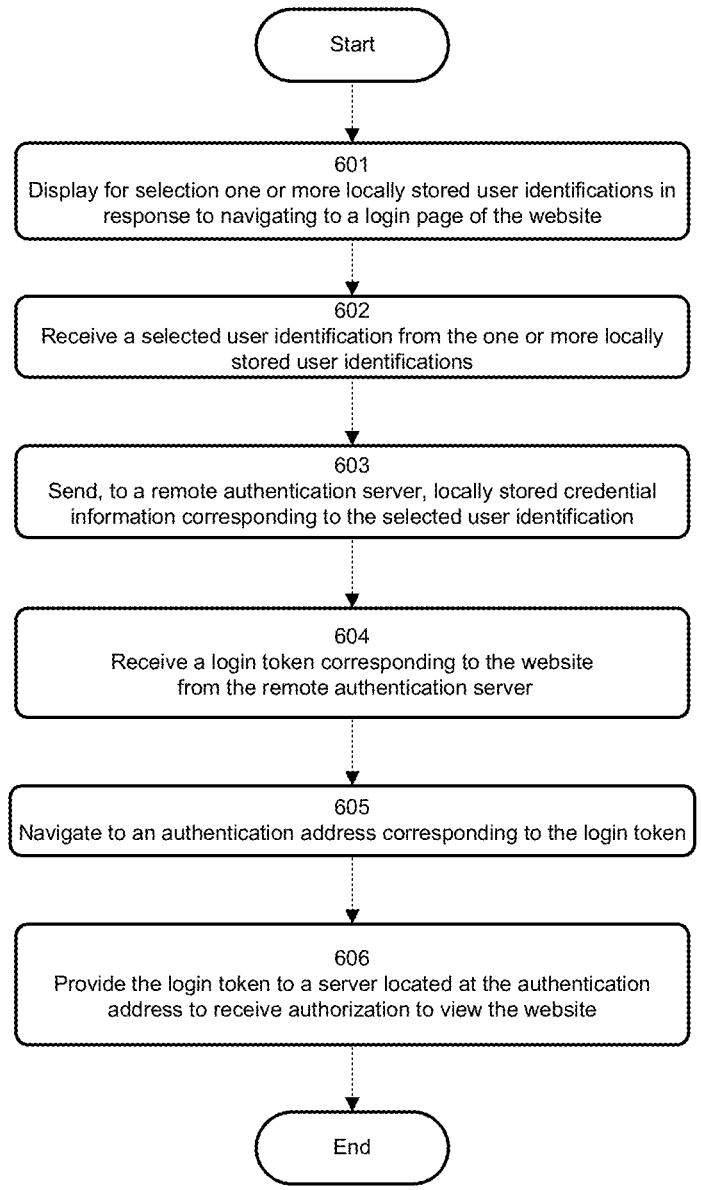
FIG. 6 is a flowchart illustrating an example process for authenticating a user using locally stored credentials according to one aspect of the subject technology.

FIG. 6 is a flowchart illustrating an example process for authenticating a user using locally stored credentials according to one aspect of the subject technology. At 601, one or more locally stored user identifications are displayed for selection (for example, in a web browser) in response to navigating to a login page of a website. At 602, a selected user identification is received from the one or more locally stored user identifications. The selected user identification may be selected by a user from, for example, a menu providing the one or more locally stored user identifications. At 603, locally stored credential information corresponding to the selected user identification is sent to a remote authentication server. In one aspect, the locally stored credential information may be retrieved from a local storage using the selected user identification. At 604, a login token corresponding to the website is received from the remote authentication server. In some aspects, the login token may have an expiration time. On receiving the login token, at 605, a web browser is navigated to an authentication address corresponding to the login token, and, at 606, the login token is provided to a server located at the authentication address to receive authorization to view the website. If the login token has an expiration time, the login token must be provided to the server before the expiration time in order to receive the authorization to view the website.

Figure 7:
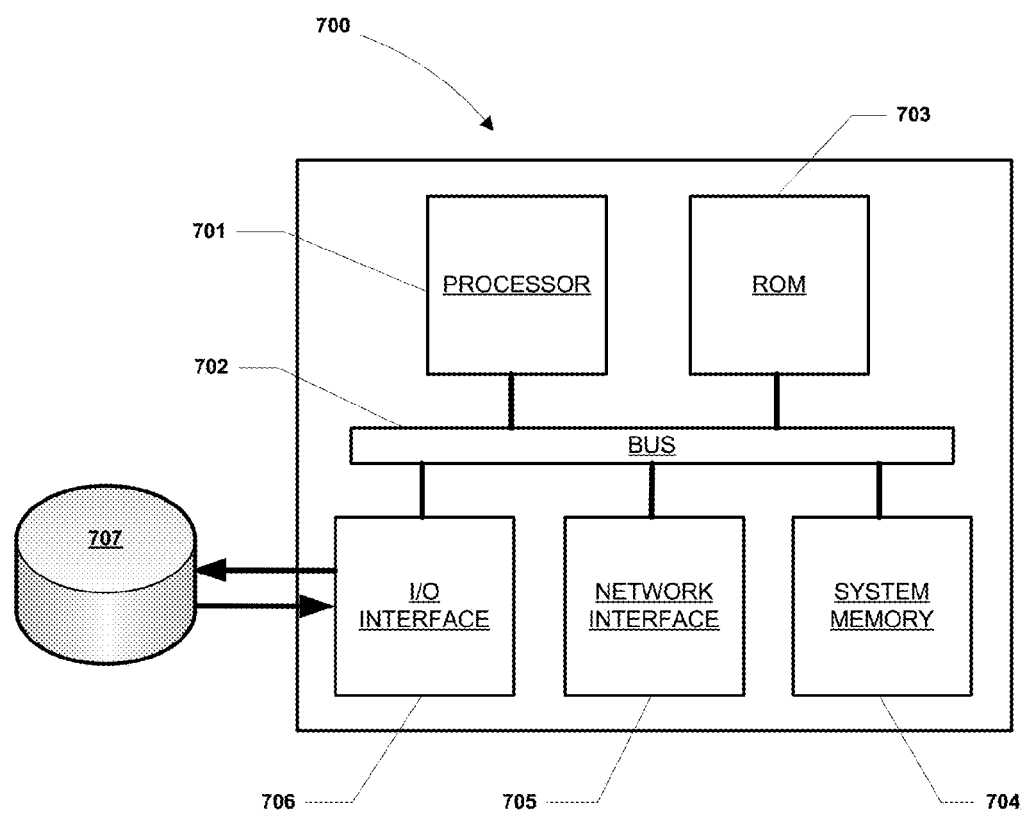
FIG. 7 is a diagram illustrating an exemplary server system for authenticating a user using locally stored credentials, including a processor and other internal components, according to one aspect of the subject technology.

FIG. 7 is a diagram illustrating an exemplary server system for authenticating a user using locally stored credentials, including a processor and other internal components, according to one aspect of the subject technology. In some aspects, a computerized device 700 (for example, computing device 101, web server 201 or 302, authentication server 312 or 505, or the like) includes several internal components such as a processor 701, a system bus 702, read-only memory 703, system memory 704, network interface 705, I/O interface 706, and the like. In one aspect, processor 701 may also be communication with a storage medium 707 (for example, a hard drive, database, or data cloud) via I/O interface 706. In some aspects, all of these elements of device 700 may be integrated into a single device. In other aspects, these elements may be configured as separate components.

Processor 701 may be configured to execute code or instructions to perform the operations and functionality described herein, manage request flow and address mappings, and to perform calculations and generate commands. Processor 701 is configured to monitor and control the operation of the components in server 700. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 701. Likewise, one or more sequences of instructions may be software stored and read from system memory 705, ROM 703, or received from a storage medium 707 (for example, via I/O interface 706). ROM 703, system memory 705, and storage medium 707 represent examples of machine or computer readable media on which instructions/code may be executable by processor 701. Machine or computer readable media may generally refer to any medium or media used to provide instructions to processor 701, including both volatile media, such as dynamic memory used for system memory 704 or for buffers within processor 701, and non-volatile media, such as electronic media, optical media, and magnetic media.

In some aspects, processor 701 is configured to communicate with one or more external devices (for example, via I/O interface 706). Processor 701 is further configured to read data stored in system memory 704 and/or storage medium 707 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 704 represents volatile memory used to temporarily store data and information used to manage device 700. According to one aspect of the subject technology, system memory 704 is random access memory (RAM) such as double data rate (DDR) RAM. Other types of RAM also may be used to implement system memory 704. Memory 704 may be implemented using a single RAM module or multiple RAM modules. While system memory 704 is depicted as being part of device 700, those skilled in the art will recognize that system memory 704 may be separate from device 700 without departing from the scope of the subject technology. Alternatively, system memory 704 may be a non-volatile memory such as a magnetic disk, flash memory, peripheral SSD, and the like.

I/O interface 706 may be configured to be coupled to one or more external devices, to receive data from the one or more external devices and to send data to the one or more external devices. I/O interface 706 may include both electrical and physical connections for operably coupling I/O interface 706 to processor 701, for example, via the bus 702. I/O interface 706 is configured to communicate data, addresses, and control signals between the internal components attached to bus 702 (for example, processor 701) and one or more external devices (for example, a hard drive). I/O interface 706 may be configured to implement a standard interface, such as Serial-Attached SCSI (SAS), Fiber Channel interface, PCI Express (PCIe), SATA, USB, and the like. I/O interface 706 may be configured to implement only one interface. Alternatively, I/O interface 706 may be configured to implement multiple interfaces, which are individually selectable using a configuration parameter selected by a user or programmed at the time of assembly. I/O interface 706 may include one or more buffers for buffering transmissions between one or more external devices and bus 702 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for authenticating to a website, the method comprising:
   receiving automatic login information from a login page associated with the website;
   selecting, based on the automatic login information, a selected local account manager from a plurality of local account managers, each local account manager comprising a list of user accounts;
   displaying, for selection by a user, one or more locally stored user identifications from a respective user account of the selected local account manager;
   receiving a selected user identification from the one or more locally stored user identifications;
   sending to a remote authentication server, locally stored credential information corresponding to the selected user identification;
   receiving, from the remote authentication server, a login token corresponding to the website, the login token comprising an authentication address and a website address;
   on receiving the login token, navigating to the authentication address provided by the login token; and
   providing the login token to a server located at the authentication address to receive authorization to view the website at the website address.

2. The computer-implemented method of claim 1, further comprising:
   receiving from a response header associated with the login page, wherein the one or more locally stored user identifications are retrieved from a local storage and displayed in response to receiving the response header.

3. The computer-implemented method of claim 2, wherein the response header associated with the login page indicates a single user identification, and only the single user identification is retrieved from the local storage.

4. The computer-implemented method of claim 2, wherein the one or more locally stored user identifications are displayed for selection by a user in a graphical bar displayed near a top of a content pane of the web browser.

5. The computer-implemented method of claim 4, on receiving the selected user identification, the method further comprising:
   providing the selected one of the locally stored user identifications to the selected account manager, wherein the stored credential information is sent to the remote authentication server by the selected local account manager component, and wherein the login token and authentication address are received by the selected local account manager in response to sending the stored credential information to the remote authentication server.

6. The computer-implemented method of claim 1, further comprising:
   receiving a redirect instruction from the server located at the authentication address; and
   navigating the web browser to the website address.

7. The computer-implemented method of claim 5, wherein the selected user identification is associated with an online user account.

8. The computer-implemented method of claim 1, wherein the website is provided by a different server than the remote authentication server.

9. The computer-implemented method of claim 1, wherein the server at the authentication address is a different server than the remote authentication server.

10. The computer-implemented method of claim 1, wherein the server at the authentication address is the remote authentication server, and wherein the login page is provided by the remote authentication server.

11. The computer-implemented method of claim 1, wherein providing the login token to the server at the authentication address includes the server at the authentication address parsing at least a portion of the authentication address to identify the login token.

12. The computer-implemented method of claim 1, wherein the login token has an expiration time, and the login token is provided to the server before the expiration time in order to receive authorization to view the website.

13. A system for managing remote storage of web browsing information, comprising:
   an authentication server;
   a client computing device having a plurality of account manager components stored thereon, each account manager component comprising a list of user accounts, the client computing device being remote from the authentication server, the client computing device comprising client instructions that, when executed, are configured to:
      receive, on navigating to a login page of a website, automatic login information from the website;
      select, based on the automatic login information, a selected account manager component from the plurality of account manager components,
   wherein the selected account manager component comprises component instructions that, when executed, cause the selected account manager component to:
      display, for selection by a user, one or more locally stored account identifiers from a respective user account of the selected account manager component in response to the automatic login information and the selection of the selected account manager component;
   receive from a web browser a selected one of the one or more locally stored account identifiers;
   look up credential information corresponding to the selected account identifier;
   send the credential information to the authentication server;

receive a login token corresponding to the website from the authentication server, the login token including an authentication address and a website address; and provide the login token, including the authentication address and website address, to the web browser for navigation to the website address after authorization to view the website from a web server at the authentication address.

14. The system of claim 13, wherein the authentication server includes server instructions that, when executed, cause the server to:

receive credential information from the client computing device;

generate the login token corresponding to the website;

set an expiration time related to the login token; and send the login token to the client device.

15. The system of claim 14, wherein the website address is sent to the client device with the login token.

16. The system of claim 15, wherein the server instructions, when executed, further cause the server to:

receive a request from a server associated with the website to validate the login token; and on confirming the request was made before the expiration time, validate the login token for the server.

17. The system of claim 16, wherein web browser includes browser instructions that, when executed, cause the web browser to:

receive the login token from the selected account manager component;

navigate the web browser to the authentication address; and provide the login token to the web server at the authentication address to login to the website.

18. The system of claim 17, wherein the browser instructions, when executed, further cause the web browser to:

receive a redirect instruction from the web server; and navigate the web browser to the website address.

19. The system of claim 13, wherein the component instructions, when executed, further cause the selected account manager component to:

on receiving the automatic login information, provide a list of users for selection at the web browser;

receive a selected user from the web browser; and wherein the credential information sent to the authentication server corresponds to the selected user.

20. The system of claim 19, wherein web browser includes browser instructions that, when executed, cause the web browser to:

receive from a response header of a login page related to the website, wherein the list of users is retrieved from the selected account manager component.

21. The system of claim 19, wherein the browser instructions, when executed, further cause the web browser to:

display the list of users in a graphic bar displayed near a top of a content pane of the web browser.

22. A non-transitory machine-readable medium having machine-executable instructions stored thereon, which when executed by a machine or computer cause the machine or computer to perform a method, the method comprising:

receiving automatic login information from a login page associated with the website;

selecting, based on the automatic login information, a selected local account manager from a plurality of local account managers, each local account manager comprising a list of user accounts;

displaying, for selection by a user, multiple locally stored user identifications from a respective user account of the selected local account manager;

receiving a selected user identification from the one or more locally stored user identifications;

sending to a remote authentication server, locally stored credential information corresponding to the selected user identification;

receiving, from the remote authentication server, a login token corresponding to the website, the login token comprising an authentication address and a website address;

on receiving the login token, navigating to the authentication address provided by the login token; and providing the login token to a server located at the authentication address to receive authorization to view the website at the website address.

23. The method of claim 1, the method further comprising:

navigating to the website address after receiving authorization to view the website based on the login token.

* * * * *